(12) United States Patent
Alet et al.

(10) Patent No.: US 8,578,811 B2
(45) Date of Patent: Nov. 12, 2013

(54) HEXAPOD ACTUATOR DEVICE

(75) Inventors: Robert Alet, Courdimanche (FR); René Le Guillou, Maurepas (FR)

(73) Assignee: Thales, Neuilly sur Seine (FR)

( * ) Notice: Subject to any disclaimer, the term of this patent is extended or adjusted under 35 U.S.C. 154(b) by 146 days.

(21) Appl. No.: 13/181,364

(22) Filed: Jul. 12, 2011

(65) Prior Publication Data

US 2012/0180593 A1 Jul. 19, 2012

(30) Foreign Application Priority Data

Jul. 13, 2010 (FR) ...................................... 10 02953

(51) Int. Cl.
*G05G 11/00* (2006.01)

(52) U.S. Cl.
USPC ...................................................... 74/490.09

(58) Field of Classification Search
USPC ............... 74/490.01, 490.03, 490.05, 490.08, 74/490.09; 434/51, 55, 57, 58; 472/59
See application file for complete search history.

(56) References Cited

U.S. PATENT DOCUMENTS

| 6,099,217 | A  | * | 8/2000  | Wiegand et al. | ............. 409/201 |
| 6,974,297 | B2 | * | 12/2005 | Brogårdh       | ...................... 414/680 |
| 7,124,660 | B2 | * | 10/2006 | Chiang         | ...................... 74/490.05 |
| 2004/0149065 | A1 | * | 8/2004  | Moran          | ...................... 74/490.04 |

OTHER PUBLICATIONS

Pham Ngoc, et al., "Development of a New 6-DOF Parallel-kinematic Motion Simulator (ICCAS 2008)", International Conference on Control, Automation and Systems 2008, Oct. 14-17, 2008, pp. 2370-2373, IEEE, Piscataway, NJ, USA, XP031367589.
A.B. Koteswara Rao, et al., "Workspace and Dexterity Analyses of Hexaslide Machine Tools", Proceedings of the 2003 IEEE International Conference on Robotics & Automation, Sep. 14-19, 2003, pp. 4104-4109, vol. 3, Piscataway, NJ, USA, XP010668285.
Julia Borras, et al., "A Reconfigurable 5-DoF 5-SPU Parallel Platform", http://upcommons.upc.edu/e-prints/bitstream/2117/6436/1/1.pdf, Nov. 5, 2009, pp. 617-623, XP002633121.

* cited by examiner

*Primary Examiner* — Justin Krause
*Assistant Examiner* — Gregory Prather
(74) *Attorney, Agent, or Firm* — Baker & Hostetler LLP

(57) ABSTRACT

A hexapod actuator device, notably used in flight simulators or driving simulators, includes six legs. A first end of each leg is notably mobilizable along a straight segment by virtue of a motorized carriage. The hexapod actuator comprises notably six segments of straight lines that may be coplanar or inclined with respect to the ground. A second end of each leg may be mounted free on a ball joint with three degrees of freedom in rotation. Each of the ball joints is secured to a mobile platform. The device lies in the field of systems allowing motion to be imparted to pilot cabins for example.

20 Claims, 4 Drawing Sheets

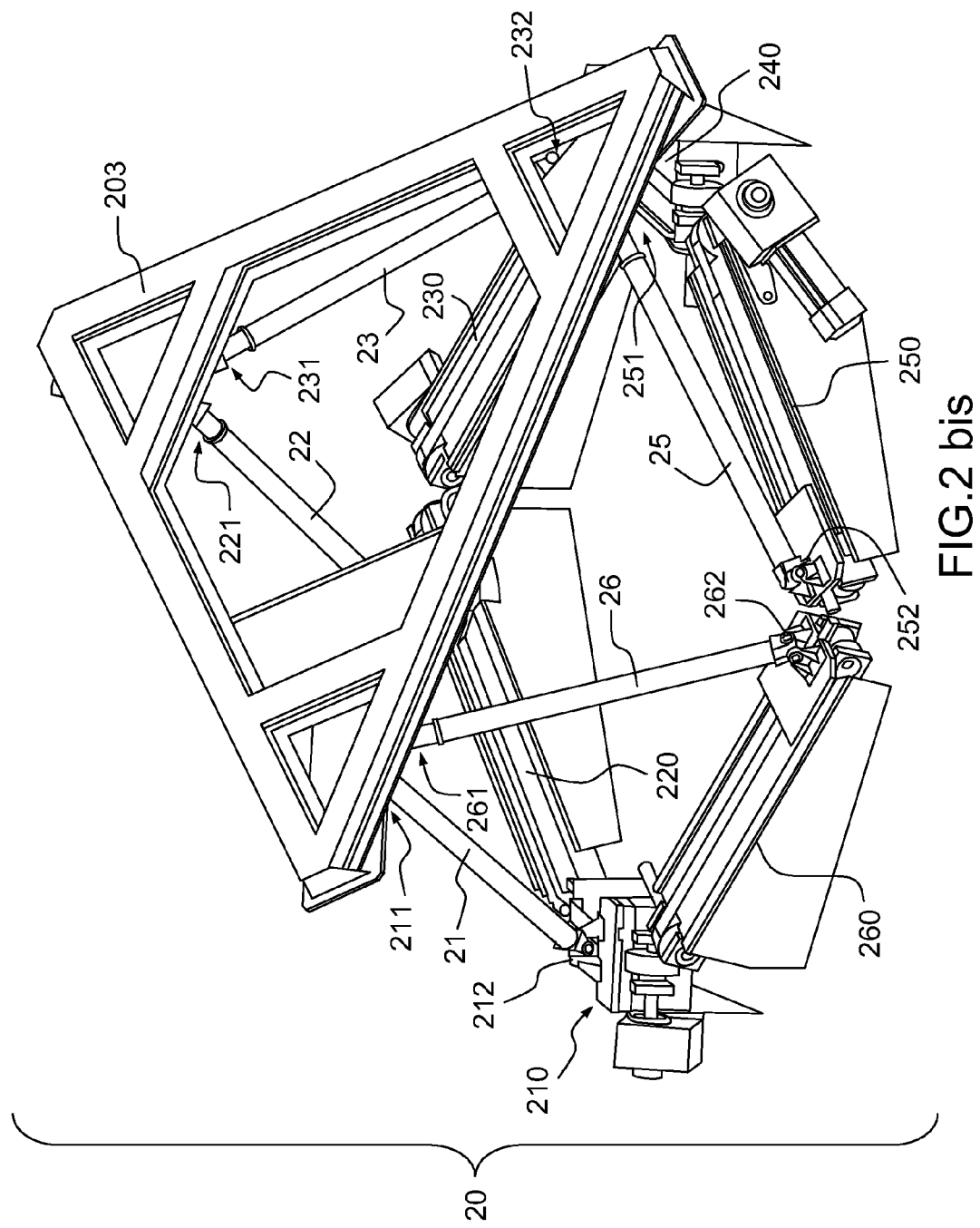
FIG.2 bis

HEXAPOD ACTUATOR DEVICE

CROSS-REFERENCE TO RELATED APPLICATION

This application claims priority to foreign French patent application No. FR 1002953, filed on Jul. 13, 2010, the disclosure of which is incorporated by reference in its entirety.

FIELD OF THE INVENTION

The present invention relates to a hexapod actuator notably used in flight simulators or driving simulators. The invention lies in the field of systems allowing motion to be imparted to pilot cabins for example.

BACKGROUND

Various motion systems may be used in flight simulators or driving simulators. Notably, mobilization systems are used in helicopter or aircraft flight simulators. They meet qualification criteria defined by certification bodies, notably the FAA, the acronym standing for the expression Federal Aviation Administration and the equivalent in Europe of the JAA, the acronym standing for the expression Joint Aviation Authorities.

The invention can notably be applied to simulators meeting FFS level B qualification criteria, the acronym standing for the expression Full Flight Simulator level B, i.e. flight simulator of level B. This type of simulator is increasingly prized by customers on account notably of their small proportions relative to simulators of FFS level D type. The invention can also be applied to simulators meeting FFS level D qualification criteria.

The best known prior art in regard to mobile platforms for simulators is a Stewart platform. The concept of the Stewart platform is based on the use of a hexapod positioner allowing motion with six degrees of freedom. Stewart mobile platforms are notably used for flight simulators, according to a design by K. Cappel. The type of motion of these platforms forms part of the family of parallel robots.

Several possible motorizations exist for moving a hexapod according to the prior art:
- hydraulic rams, mainly used to mobilize loads of greater than about fourteen tonnes;
- screw-type electric rams, for loads of less than about fourteen tonnes;
- pneumatic systems for small loads, for example less than five hundred kilos.

The existing motorizations, making it possible to move a hexapod according to the prior art, are products having a fixed configuration for a given application. For example to change the travel of a ram, it is necessary to place a stop inside the ram or to elongate the length of the screw. Therefore, modifying the length of the ram gives rise to a new design of the ram, a revalidation and a re-investigation of the kinematics and of the geometry of the hexapod.

The existing products do not therefore make it possible to carry out simple adaptations of geometry, as a function of customer requests, in regard to simulators notably. Moreover, these products are produced in small quantities and are therefore very expensive.

In the case of hexapods with electric rams, the level of vibration and the noise are more significant than with hydraulic hexapods, and this may disturb pilot training. This phenomenon is due mainly to the recycled motions of the balls on the screw or to the rollers propelled at high speed on the screw.

Moreover, in the case of a hexapod according to the prior art, the integration of safety elements is very constraining, notably:
- The return to a horizontal stable position, in the case of a power outage or an electrical control fault, so as to facilitate the exit of the crew, requires an ancillary backup power supply source. This type of backup power supply is expensive both in respect of its purchase and its servicing.
- In the case of failure of the command and control systems, shock absorbers must be integrated to avoid fierce decelerations at the end of the travel, because of the presence of the screw; they are designed and certified specially for this type of application and are therefore much more expensive than the shock absorbers chosen from the catalogues of industry suppliers.

SUMMARY OF THE INVENTION

The invention notably alleviates the aforementioned drawbacks. For this purpose, the subject of the invention is a hexapod actuator device comprising six legs. A first end of each leg is mobilizable along a straight segment. Each of the six straight segments belongs to a distinct straight line. The hexapod actuator device comprises six segments of straight lines which are coplanar or inclined with respect to the ground. A second end of each leg is mounted on a ball joint with three degrees of freedom in rotation, each of the ball joints being interdependent with a mobile platform.

In an advantageous embodiment, each straight segment can comprise a first end belonging to a first ellipse and a second end belonging to a second ellipse, the two ellipses being notably concentric.

In another embodiment, the two ellipses may be merged into a circle.

In another embodiment, the segments of straight lines may be interdependent with a support on the ground.

In another embodiment, the segments of straight lines may be interdependent with a support on the ceiling.

In an advantageous embodiment, the segments of straight lines may be embodied by rails, each first end of each leg being able to be wheeled, the said legs possibly being mobilized by at least one linear electromagnetic motor.

In another embodiment, the segments of straight lines may be embodied by a rail, each first end of each leg resting on a carriage guided on the said rail, the carriage being propelled by a motor that gears with a rack.

In an advantageous embodiment, the carriage may be propelled by a motor that gears with a rack.

In another embodiment, the carriage may be propelled by a motor that gears with a notched belt.

In another embodiment, the carriage may be propelled by adhesion.

In another embodiment, the carriage is propelled by adhesion.

In another embodiment, the carriage is propelled by a ball screw or roller screw.

The invention has notably the main advantages of reducing the cost of production of simulator mobilization devices, while guaranteeing a reliable and efficacious mobilization system.

BRIEF DESCRIPTION OF THE DRAWINGS

Other characteristics and advantages of the invention will become apparent with the aid of the description which follows, given by way of nonlimiting illustration, and offered with regard to the appended drawings which represent:

FIG. 2bis: a diagram of a variant of the first possible embodiment of the device according to the invention;

DETAILED DESCRIPTION

Figure 1:
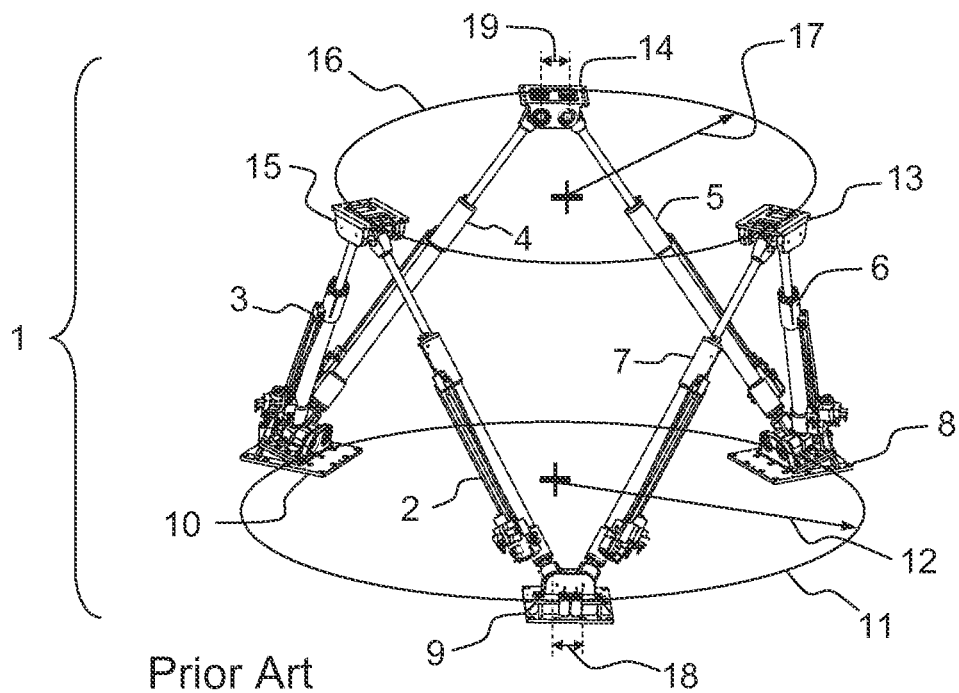
FIG. 1: a hexapod positioner according to the prior art.

FIG. 1 represents a first hexapod positioner 1, according to the prior art, adapted to the mobilization of a simulation platform for a simulator. The first hexapod positioner, otherwise dubbed a Stewart platform, possesses six degrees of freedom: three degrees of freedom in translation as well as three degrees of freedom in rotation about angles: pitch, roll and yaw, otherwise dubbed Euler angles. The first hexapod positioner 1 according to the prior art comprises six first legs 2, 3, 4, 5, 6, 7. The six first legs 2, 3, 4, 5, 6, 7 are mounted two by two by their lower end on a first articulation 8, 9, 10. The lower ends of the six first legs 2, 3, 4, 5 may be mounted on a first articulation 8, 9, 10 by a ball joint with three degrees of freedom in rotation. The three first articulations 8, 9, 10 are fixed in a secure manner to a fixed plinth 11. The plinth 11 may be for example a concrete slab, suitable for supporting the weight of the simulation platform. The three first articulations 8, 9, 10 are fixed to the plinth 11, represented by a first disc 11 in FIG. 1, so as to be distributed uniformly around the circumference of the first disc 11. The first disc 11 has a first fixed radius 12. Each first leg 2, 3, 4, 5, 6, 7 is mounted by its lower end on a first articulation 8, 9, 10, with a first leg 2, 3, 4, 5, 6, 7 situated on its right when rotating in the trigonometric sense around the circumference of the first disc 11. The upper ends of the six first legs 2, 3, 4, 5, 6, 7 are mounted two by two by their upper end on a second articulation 13, 14, 15. The upper ends of the six first legs are mounted on the second articulations 13, 14, 15 by way of ball joints with three degrees of freedom. The three second articulations 13, 14, 15 are fixed in a secure manner to a mobile platform 16. The mobile platform is represented by a second disc 16 around the circumference of which the second articulations 13, 14, 15 are distributed in a uniform manner. The radius of the second disc 16 is a second fixed radius 17. Each first leg 2, 3, 4, 5, 6, 7 is mounted at its upper end with a leg situated on its left when rotating in the trigonometric sense around the second disc 16. The six first legs 2, 3, 4, 5, 6, 7 are actuated so as to change length and thus to vary the orientation of the mobile platform 16. To a given position of the second disc 16 there corresponds a single combination of six lengths of the first legs 2, 3, 4, 5, 6, 7. Each first leg 2, 3, 4, 5, 6, 7 can comprise a ram, the lengthening of which makes it possible to vary the length of the first leg 2, 3, 4, 5, 6, 7.

The first hexapod positioner 1 according to the prior art is characterized by a geometry defined notably by constant parameters and variable parameters. The values of the parameters depend notably on the type of use of the first hexapod positioner 1.

The constant parameters may be the following:
the first radius 12 of the first disc 11;
the second radius 17 of the second disc 16;
a first inter-axial gap 18 of the first articulations 8, 9, 10; the said first inter-axial gap being the distance between the two lower ends of two first legs 2, 3, 4, 5, 6, 7, fixed to the same first articulation 8, 9, 10;
a second inter-axial gap 19 of the second articulations 13, 14, 15; the said second inter-axial gap being the distance between the two upper ends of two first legs 2, 3, 4, 5, 6, 7, fixed to the same second articulation 13, 14, 15;
a third inter-axial gap representing the distance between the first and second articulations 8, 9, 10, 13, 14, 15, when the ram of each first leg 2, 3, 4, 5, 6, 7 is retracted.

The variable parameters are notably the travels of each ram of each leg. The value of the third inter-axial gap added to the value of the travel of a ram gives the length of the first leg 2, 3, 4, 5, 6, 7 comprising the ram.

This type of actuator according to the prior art requires rams which are expensive overall and very inflexible as regards their implementation: few adaptations are possible according to the desired use.

Figure 2:
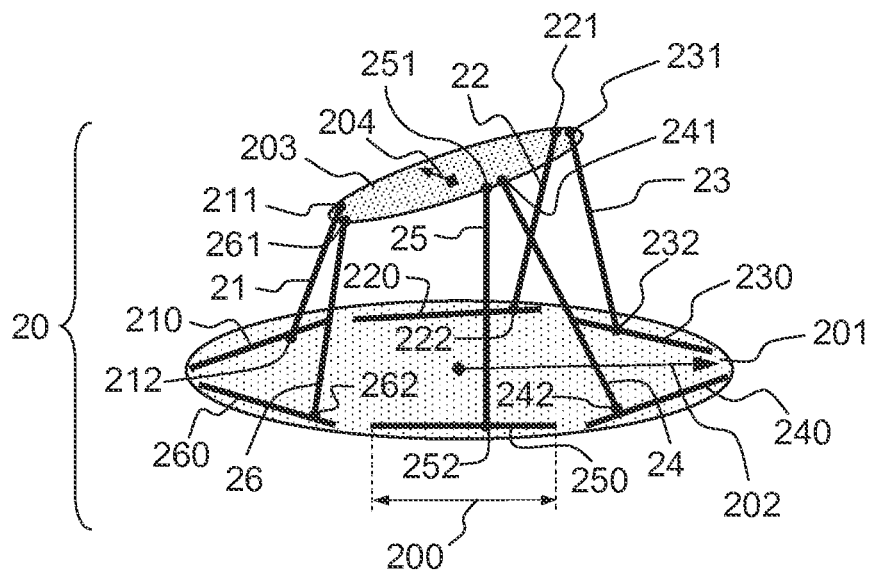
FIG. 2: a diagram of a first possible embodiment of the device according to the invention.

FIG. 2 represents a second hexapod positioner 20 according to the invention. By considering the parameters of the hexapod, according to the prior art, represented in FIG. 1, a general principle of the hexapod positioner 20 according to the invention is notably to fix the following parameters:
the second radius 17 of the second disc 16;
the second inter-axial gap 19 of the second articulations 13, 14, 15;
the travel of each ram of each first leg 2, 3, 4, 5, 6, 7;
the third inter-axial gap representing the distance between the first and second articulations 8, 9, 10, 13, 14, 15, when the ram of a first leg 2, 3, 4, 5, 6, 7 is retracted;

and to leave the following parameters variable:
the first inter-axial gap 18 of the first articulations 8, 9, 10;
the first radius 12 of the first circle 11 passing through the lower ends of the articulations of the six first legs 2, 3, 4, 5, 6, 7.

FIG. 2 represents a first exemplary implementation of the device of a hexapod positioner 20 according to the invention. By definition, the second hexapod positioner 20 comprises six second legs 21, 22, 23, 24, 25, 26. The six second legs 21, 22, 23, 24, 25, 26 of the hexapod according to the invention having a fixed length, they may be embodied by a connecting rod.

In the second hexapod positioner device 20 according to the invention, each inter-distance between two lower ends of two second neighbouring legs 21, 22, 23, 24, 25, 26 varies in an independent manner. The second legs 21, 22, 23, 24, 25, 26 can each move on a first straight segment 210, 220, 230, 240, 250, 260. The six degrees of freedom typical of the operation of a hexapod, according to the prior art, are then indeed effected by the second hexapod positioner 20 according to the invention. Each first straight segment 210, 220, 230, 240, 250, 260 has a fixed length 200 which may be different for each first straight segment 210, 220, 230, 240, 250, 260. Generally, each first straight segment 210, 220, 230, 240, 250, 260 can belong to one and the same plane or at least to parallel planes, that is to say coplanar. The six first straight segments 210, 220, 230, 240, 250, 260 each belong to a different straight line. Hereinafter, by way of example and to facilitate the disclosure of the invention, the displacement segments for the lower ends of the legs of the hexapod actuator according to the invention are represented in a coplanar manner.

Each first straight segment 210, 220, 230, 240, 250, 260 can comprise a first end belonging to a first ellipse, and a second end belonging to a second ellipse. In FIG. 2, the first ellipse and the second ellipse are merged and form a third circle 201. In FIG. 2, each end of each first straight segment 210, 220, 230, 240, 250, 260 forms part of the third circle 201 of third fixed radius 202. The third circle 201 represents a support on which may be fixed for example rails embodying the straight segments 210, 220, 230, 240, 250, 260.

Each upper end of the second legs 21, 22, 23, 24, 25, 26 may be mounted free on a ball joint 211, 221, 231, 241, 251, 261 with three degrees of freedom in rotation. The ball joints 211, 221, 231, 241, 251, 261 may be coplanar and belong to one and the same fourth circle 203 of fourth fixed radius 204. The ball joints 211, 221, 231, 241, 251, 261 may be fixed to one and the same mobile platform. For example, the ball joints 211, 221, 231, 241, 251, 261 may be mounted in pairs on an articulation 13, 14, 15, such as represented in FIG. 1. The mobile platform can for example carry a pilot cabin in the case of a vehicle or aircraft simulator.

In FIG. 2, the first exemplary embodiment is constructed using first segments of displacements 210, 220, 230, 240, 250, 260 for the lower ends 212, 222, 232, 242, 252, 262 of the second legs 21, 22, 23, 24, 25, 26. The first segments 210, 220, 230, 240, 250, 260 can form part of a regular hexagon. This type of configuration makes it possible advantageously to favour the yaw motions. The first segments 210, 220, 230, 240, 250, 260 may be embodied by linear spindles that are commonly found in the machine tool equipment trade or the equipment trade for transfer machines, notably used in assembly lines. The linear spindles may be composed of motorized guide rails comprising notably: a motor that gears with a rack or a toothed belt, or is propelled by adhesion or without contact by a linear electromagnetic motor, depending on the acceleration performance required. For example: the lower ends 212, 222, 232, 242, 252, 262 can then comprise a notched belt adapted to the displacement of the said lower ends 212, 222, 232, 242, 252, 262 on the guide rail formed by the rack. In another implementation of the device according to the invention, each first segment 210, 220, 230, 240, 250, 260 may be embodied by a guide rail, each lower end 212, 222, 232, 242, 252, 262 of the second legs 21, 22, 23, 24, 25, 26 comprising a wheel moving on each guide rail. In another implementation of the device according to the invention, each lower end 212, 222, 232, 242, 252, 262 of the second legs 21, 22, 23, 24, 25, 26 can rest on a carriage guided on the guide rail. Advantageously, an actuator using rails associated with wheels is in principle silent and generates no or few vibrations. Moreover, at each end of the first segments 210, 220, 230, 240, 250, 260 may be positioned standard end-of-travel shock absorbers integrated into the rail and fixed directly to the support. The set formed of the loadings of the simulation platform is therefore distributed at the level of the support.

By convention and hereinafter in the patent application, the lower ends of the legs of the hexapod according to the invention are the ends attached to a fixed part of the simulator, that is to say the support of the simulator. While the upper ends of the legs of the hexapod according to the invention are the ends attached to the mobile part of the simulator: the simulation platform of the simulator.

Advantageously, to increase the swing of the simulation platform, it is beneficial to incline each rail with respect to the ground, so as notably to increase the effects of vertical, longitudinal and lateral displacement such as represented in FIG. 2bis. In FIG. 2bis, each of the first segments 210, 220, 230, 240, 250, 260 is inclined with respect to the support. Each of the first segments 210, 220, 230, 240, 250, 260 is disposed in such a way as to be situated head-to-tail with respect to the neighbouring segments. For example, each end of each consecutive segment 210, 220, 230, 240, 250, 260 may be situated for example at one and the same distance from the support.

Figure 3:
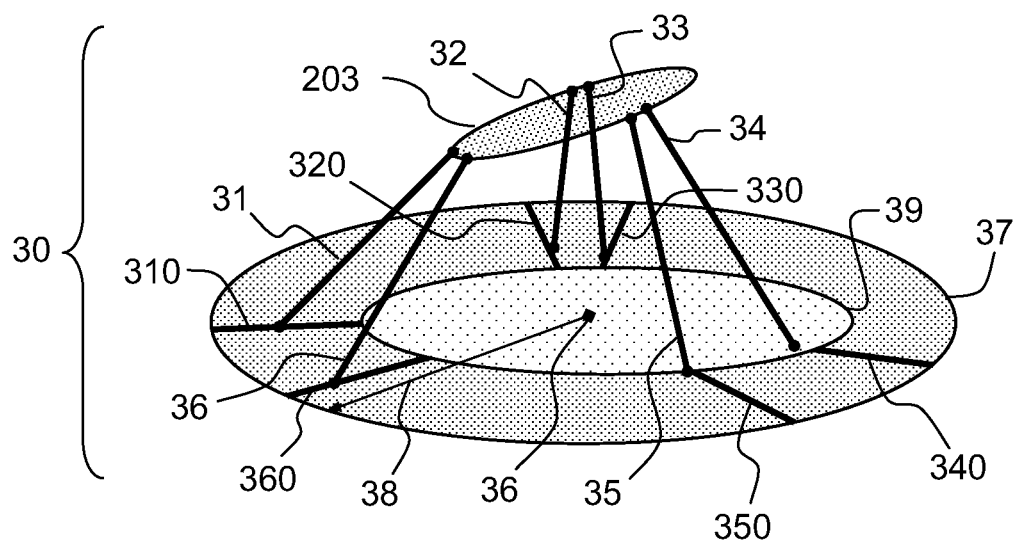
FIG. 3: a diagram of a second possible embodiment of the device according to the invention.

FIG. 3 represents a second possible embodiment of the hexapod according to the invention. FIG. 3 therefore represents a third hexapod positioner 30 according to the invention. The third hexapod 30 comprises six third legs 31, 32, 33, 34, 35, 36, such as the second legs 21, 22, 23, 24, 25, 26 represented in FIG. 2. As in FIG. 2 each third legs 31, 32, 33, 34, 35, 36 can have a fixed length and be embodied by means of a connecting rod. The lower ends of the third legs 31, 32, 33, 34, 35, 36 can move in a longitudinal manner on a second segment 310, 320, 330, 340, 350, 360. The second segments 310, 320, 330, 340, 350, 360 may be oriented in a concentric manner, towards a first centre 36 of a fifth circle 37 of fifth radius 38. The second segments 310, 320, 330, 340, 350, 360 can extend between the fifth circle 37 and a sixth circle 39 situated inside fifth circle 37 and of same first centre 36 as the fifth circle 37. The upper ends of the third legs 31, 32, 33, 34, 35, 36 can each be mounted free on a ball joint with three degrees of freedom in rotation 211, 221, 231, 241, 251, 261 such as is represented in FIG. 2. This configuration particularly favours the vertical displacements of a simulation platform.

Figure 4:
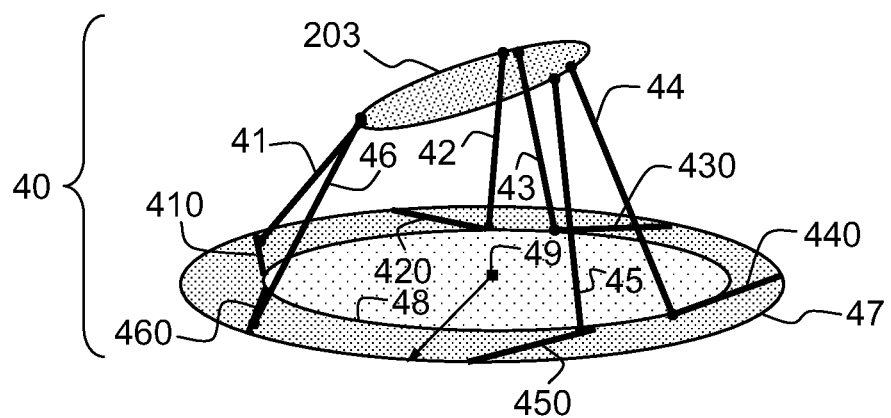
FIG. 4: a diagram of a third possible embodiment of the device according to the invention.

FIG. 4 represents a third possible embodiment of the hexapod according to the invention. The third embodiment is a fourth hexapod actuator 40 according to the invention. The fourth hexapod 30 comprises six fourth legs 41, 42, 43, 44, 45, 46, such as the third legs 31, 32, 33, 34, 35, 36 represented in FIG. 3. As in FIG. 3 the six fourth legs 41, 42, 43, 44, 45, 46 can have a fixed length and may be embodied by means of connecting rods. The lower ends of the fourth legs 41, 42, 43, 44, 45, 46 can move in a longitudinal manner on a third segment 410, 420, 430, 440, 450, 460. The third segments 410, 420, 430, 440, 450, 460 can extend between a seventh circle 47 and an eighth circle 48 situated inside the seventh circle 47 and of same second centre 49 as the seventh circle 47. The third segments 410, 420, 430, 440, 450, 460 are not necessarily oriented towards the second centre 49. The upper ends of the fourth legs 31, 32, 33, 34, 35, 36 can each be mounted free on a ball joint with three degrees of freedom in rotation 211, 221, 231, 241, 251, 261 such as is represented in FIG. 2. This configuration is a generalization of the configuration represented in FIG. 3.

Figure 5:
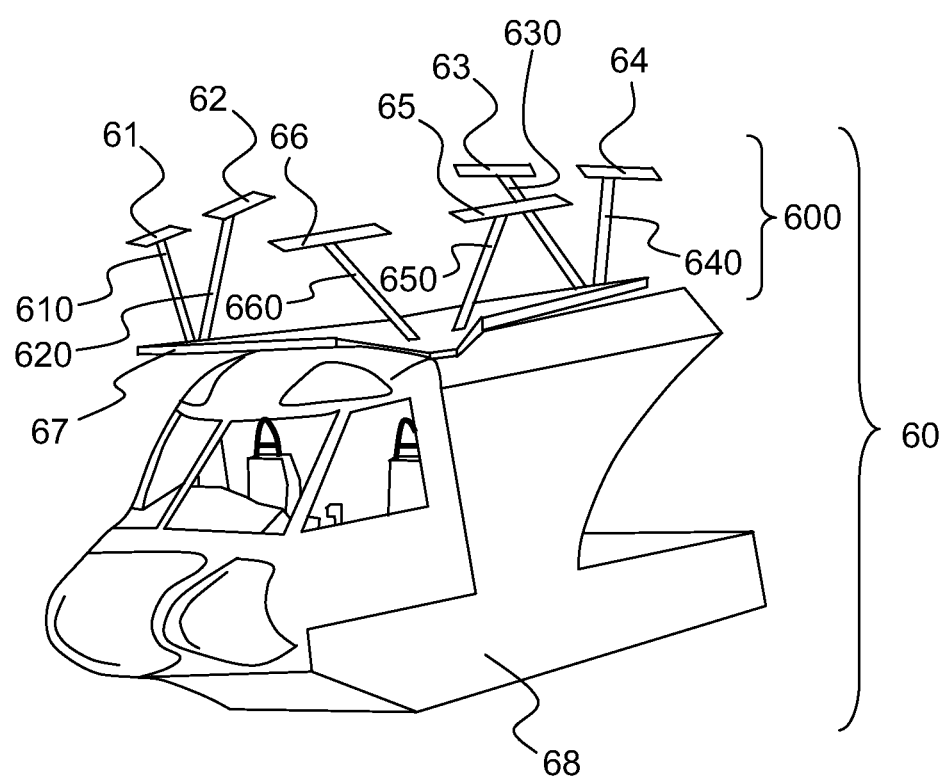
FIG. 5: a fourth possible embodiment of the device according to the invention.

FIG. 5 represents a mode of possible use 60 of the hexapod according to the invention. FIG. 5 represents a fourth hexapod 600 according to the invention comprising six sixth legs 610, 620, 630, 640, 650, 660. Six fifth segments 61, 62, 63, 64, 65, 66 are fixed in a secure manner to a ceiling of a room, for example a hangar. Lower ends of the six fifth legs 610, 620, 630, 640, 650, 660 are mounted so as to each move on a fifth segment 61, 62, 63, 64, 65, 66. Each upper end of the six sixth legs 610, 620, 630, 640, 650, 660 is mounted on a ball joint with three degrees of freedom in rotation. The ball joints are themselves fixed to a simulation platform 67 on which a pilot cabin 68 of a helicopter is mounted. Advantageously such a simulation device makes it possible to improve the pilot's sensations by placing the cabin 68 of the helicopter under conditions close to the real conditions.

In another advantageous use, the device according to the invention makes it possible to supplement performance obtained by a vibrating platform with three degrees of freedom for cabins of simulators of FFS level D type, by adding the three missing degrees of freedom to these vibrating platforms. In the case of use as a vibrating platform, only the cabin of the simulator is mobile; the viewing device remains fixed, so as to be able to displace with a minimum of constraint the cabin in vibrating-platform configurations. Indeed, the viewing device being very heavy and the vibrating platforms requiring a great deal of energy, it is particularly judicious in this case to site the viewing device outside the pilot cabin.

Advantageously the hexapod actuators according to the invention, formed of rails and wheels, are in principle silent and do not generate any vibrations. For example such actuators are used in planing machines which are very sensitive to vibrations. Moreover, at each end of the first segments may be positioned standard end-of-travel shock absorbers integrated into the rail and fixed directly to a support.

Advantageously, such a hexapod actuator according to the invention may be implemented using commercially existing guide rails, only the length of which is adapted. The rails can comprise a motorization adapted to the application of the hexapod actuator according to the invention. For example: a linear electromagnetic motor, adapted to be used by vibrating devices with a vibration frequency of greater than fifty hertz, having a high acceleration and not supporting any play, and associated with guide carriages for machine tools. The said guide carriages may be guide carriages with circulation of caged balls advantageously possessing a long lifetime and extremely gentle operation. This type of linear motor adapted to a hexapod positioner according to the invention advantageously makes it possible to carry out motions of low amplitude of the order of plus or minus five degrees of angle. This type of linear motor also makes it possible to simulate vibration frequencies of the type of those felt aboard a helicopter when changing flight phases: for example hovering, flight with ground effect, vortex flight. In another implementation, the use of a rack-type motor with long travels makes it possible to produce larger amplitudes with angles of the order of some twenty or so degrees, such as required for example for simulators meeting the FFS level B qualification criteria.

Another of the advantages of the present invention is that it is able to be implemented using actuators or other components produced en masse and therefore enjoying a beneficial price. This therefore makes it possible to reduce the price of production of simulators using actuators according to the invention.

One of the advantages of the actuator device according to the invention is that it is constructed on the basis of modular independent elements, that can be easily replaced without any impact on the remainder of the actuator. The dimensioning of the actuator according to the invention is therefore greatly simplified through the modularity of its components, depending on its use.

Another advantage of the device according to the invention is that it allows a decrease in the spurious vibrations and accelerations caused by the ball screws or the rollers of the commonly used hexapod mobilization devices. Advantageously, this makes it possible not to disturb the training of the pilot and to avoid an error of interpretation of the spurious vibrations/accelerations by the pilot. Another advantage relative to the existing devices is a reduction in the noise of the mobile platform in motion.

Advantageously, the device according to the invention makes it possible to improve the safety of simulators by returning to a stable down position so as to allow the crew to evacuate the cabin in the case of emergency shutdown, for example in the case of a fault or loss of power.

Certification of the simulator in terms of safety is simplified by using the mobilization device of the simulator according to the invention: indeed, the integration of commercially existing end-of-travel shock absorbers, which are already accredited and widely used, makes them into damping systems known for their reliability.

The invention claimed is:

1. A hexapod actuator device, resting on a substantially planar support, comprising:
    six legs, each of the six legs having a first end, and a second end opposite the first end; and
    six straight segments fixed relative to the planar support such that each of the six straight segments is either coplanar or inclined with respect to the planar support, each of the six straight segments defining a straight line that is distinct from all other straight lines defined by all other six straight segments, each of the six straight segments having a first end, and a second end opposite the first end,
    wherein projections of the straight lines onto the planar support all lie within a circular area of the planar support, a projection of each of the straight lines lying within a distinct sector of the circular area of the planar support,
    wherein the first end of each of the six legs is movable in translation along a corresponding straight segment, and
    wherein a second end of each of the six legs is mounted on a ball joint with three degrees of freedom in rotation, each ball joint being interdependent with a mobile platform.

2. The device according to claim 1, wherein the six straight segments are inclined such that each of the six straight segments is disposed head-to-tail with respect to neighboring straight segments.

3. The device according to claim 1, wherein the six straight segments are interdependent with the planar support disposed on a ground.

4. The device according to claim 1, wherein the six straight segments are interdependent with the planar support disposed on a ceiling.

5. The device according to claim 1, wherein the six straight segments are embodied by rails, each first end of the six legs including a wheel, said six legs being mobilized by at least one linear electromagnetic motor.

6. The device according to claim 1, wherein the six straight segments are embodied by a rail, each first end of the six legs resting on a carriage guided on the rail.

7. The device according to claim 6, wherein the carriage is propelled by a motor that gears with a rack.

8. The device according to claim 6, wherein the carriage is propelled by a motor that gears with a notched belt.

9. The device according to claim 6, wherein the carriage is propelled by friction of a motorized wheel on the rail.

10. The device according to claim 6, wherein the carriage is propelled by a ball screw or a roller screw.

11. The device according to claim 1, wherein each of the six straight segments is coplanar with respect to the planar support.

12. The device according to claim 1, wherein at least one of the six straight segments is inclined with respect to the planar support.

13. The device according to claim 1, wherein a projection of a first end of each straight line onto the planar support lies on a perimeter of a first circle on the planar support.

14. The device according to claim 13, wherein a projection of a second end of each straight line onto the planar support lies on the perimeter of the first circle on the planar support.

15. The device according to claim 13, wherein a projection of a second end of each straight line onto the planar support lies on a perimeter of a second circle on the planar support, the second circle having a diameter that is different from a diameter of the first circle.

16. The device according to claim 15, wherein the projection of at least one of the straight lines onto the planar support is oriented in a concentric manner toward a center of the second circle.

17. The device according to claim 16, wherein the projection of all of the straight lines onto the planar support are oriented in a concentric manner toward the center of the second circle.

18. The device according to claim 15, wherein the projection of at least one of the straight lines onto the planar support is not oriented in a concentric manner toward a center of the second circle.

19. The device according to claim 18, wherein the projection of all of the straight lines onto the planar support are not oriented in a concentric manner toward a center of the second circle.

20. The device according to claim 15, wherein the first circle is concentric with the second circle.

* * * * *